United States Patent
Wunderer et al.

(10) Patent No.: US 9,963,973 B2
(45) Date of Patent: May 8, 2018

(54) BLADING

(71) Applicant: MTU Aero Engines GmbH, Munich (DE)

(72) Inventors: Roland Wunderer, Unterschleissheim (DE); Harald Passrucker, Munich (DE)

(73) Assignee: MTU Aero Engines GmbH, Munich (DE)

( * ) Notice: Subject to any disclaimer, the term of this patent is extended or adjusted under 35 U.S.C. 154(b) by 300 days.

(21) Appl. No.: 14/933,581

(22) Filed: Nov. 5, 2015

(65) Prior Publication Data
US 2016/0108734 A1    Apr. 21, 2016

Related U.S. Application Data

(63) Continuation of application No. 13/683,669, filed on Nov. 21, 2012, now Pat. No. 9,194,235.

(30) Foreign Application Priority Data

Nov. 25, 2011   (EP) .................................... 11190851
Feb. 27, 2012   (EP) .................................... 12157031

(51) Int. Cl.
*F01D 5/14*   (2006.01)
*B23P 15/02*   (2006.01)
*F01D 9/04*   (2006.01)

(52) U.S. Cl.
CPC .............. *F01D 5/143* (2013.01); *B23P 15/02* (2013.01); *F01D 5/145* (2013.01); *F01D 9/041* (2013.01);
(Continued)

(58) Field of Classification Search
CPC ............................. F01D 5/143; F05D 2240/80
See application file for complete search history.

(56) References Cited

U.S. PATENT DOCUMENTS 7,134,842 B2   11/2006   Tam et al.
7,217,096 B2 *   5/2007   Lee ......................... F01D 5/143
                                                              416/223 A
(Continued)

FOREIGN PATENT DOCUMENTS

DE         3202855 C1    3/1983
EP         0997612 A2    5/2000
(Continued)

OTHER PUBLICATIONS

Atkins, M. J., "Secondary losses and end-wall profiling in a turbine cascade", IMechE Conference on Turbomachinery: Efficiency Prediction and Improvement, xx, xx Bd. 6, 1, Jan. 1987, Seiten pp. 29-42, XP001012087.
(Continued)

*Primary Examiner* — Ninh H Nguyen
(74) *Attorney, Agent, or Firm* — Barlow, Josephs & Holmes, Ltd.

(57) ABSTRACT

A blading for a turbomachine, particularly for a gas turbine, wherein thickened areas and depressions are formed and disposed on a lateral wall having a plurality of blades such that at least one depression or thickened area is disposed at a blade pressure side and at least one thickened area or depression is disposed at a blade suction side for each blade of the plurality of blades.

17 Claims, 5 Drawing Sheets

(52) U.S. Cl.
CPC ...... *F05D 2220/32* (2013.01); *F05D 2230/10* (2013.01); *F05D 2230/30* (2013.01); *F05D 2240/121* (2013.01); *F05D 2240/122* (2013.01); *F05D 2240/303* (2013.01); *F05D 2240/304* (2013.01); *F05D 2240/80* (2013.01); *Y02T 50/673* (2013.01); *Y10T 29/49336* (2015.01)

(56) References Cited

U.S. PATENT DOCUMENTS

| | | | |
|---|---|---|---|
| 7,354,243 | B2 | 4/2008 | Harvey |
| 7,690,890 | B2 * | 4/2010 | Aotsuka .................. F01D 5/143 415/191 |
| 8,206,115 | B2 * | 6/2012 | Gupta ..................... F01D 5/143 416/193 A |
| 8,439,643 | B2 | 5/2013 | Kuhne et al. |
| 8,459,956 | B2 | 6/2013 | Pandey et al. |
| 2003/0113206 | A1 | 6/2003 | Heyward et al. |
| 2007/0258818 | A1 | 11/2007 | Allen-Bradley et al. |
| 2011/0044818 | A1 | 2/2011 | Kuhne et al. |
| 2011/0189023 | A1 | 8/2011 | Guimbard et al. |

FOREIGN PATENT DOCUMENTS

| | | |
|---|---|---|
| EP | 1712737 A1 | 10/2006 |
| EP | 1967694 A2 | 9/2008 |
| EP | 1995410 A1 | 11/2008 |
| EP | 2241721 A2 | 10/2010 |
| EP | 2261462 A1 | 12/2010 |
| EP | 2458148 A1 | 5/2012 |
| EP | 2589752 A2 | 5/2013 |
| EP | 2597257 A1 | 5/2013 |
| WO | 2011039352 A2 | 4/2011 |

OTHER PUBLICATIONS

Formular Erfindungsmeldung, "Beschreibung der Erfindung", Apr. 6, 2010.

Inventecs Patentingenieure, "Recherchebericht mit einer Kurdarstellung der ermittelten Dokumente", Umfangskonturierte Seitenwand in Turbomaschinen, Jun. 16, 2011.

* cited by examiner

BLADING

CROSS REFERENCE TO RELATED APPLICATION

This application is a continuation of and claims priority from earlier filed non-provisional patent application Ser. No. 13/683,669, filed Nov. 21, 2012, the entire contents thereof is incorporated herein by reference.

BACKGROUND AND SUMMARY OF THE INVENTION

The invention relates to a blading for a turbomachine, in particular an internal combustion engine having at least one compressor stage, combustion chamber and turbine stage, preferably a gas turbine, according to the preamble of claim 1, and a manufacturing method for such a blading.

A blade passage of a turbomachine is generally defined by a hub-side and a housing-side lateral wall as well as guide vanes or rotating blades disposed therebetween, each of the lateral walls being able to be fixed relative to the hub or housing. Increased deflections of the flow may occur in blade passages due to the effect of wall friction in the region of the lateral walls, whereby in part strongly pronounced secondary flows result. These secondary flows cause increased losses.

A blading for a turbine is known from EP 1 995 410 A1, in which thickened areas are formed at suction and pressure sides as well as behind the trailing edges of the blade and depressions are formed in the center between adjacent blades on a lateral wall having a plurality of blades. Bladings for turbines or turbomachines are known from EP 2 248 966 A1 and DE 32 02 855 C1, in which elevations are formed on a lateral wall having a plurality of blades.

The object of the present invention is to provide an improved blading and a method for the manufacture thereof.

This object is achieved by a blading with the features of claim 1 or 2 as well as by a manufacturing method for a blading with the features of claim 12. Advantageous enhancements are the subject of the dependent claims.

According to a first aspect of the present invention, in the case of a blading for a turbomachine, in particular a compressor stage or turbine stage of an internal combustion engine, preferably a gas turbine, in which thickened areas and depressions are formed on a lateral wall having a plurality of blades, for each blade of the plurality of blades, at least one depression is disposed at a pressure side of the blade and at least one thickened area is disposed at a suction side of the blade.

According to a second aspect of the present invention, in the case of a blading for a turbomachine, in particular a compressor stage or turbine stage of an internal combustion engine, preferably a gas turbine, in which thickened areas and depressions are formed on a lateral wall having a plurality of blades, for each blade of the plurality of blades, at least one depression is disposed at a suction side of the blade and at least one thickened area is disposed at a pressure side of the blade.

By this targeted combined introduction of thickened areas and depressions at pressure or suction sides, respectively, an advantageous local adaptation of the static pressure and the flow velocity can be achieved, whereby secondary flows can be influenced advantageously and flow losses can be reduced. In addition to the reduction in losses in the blade channels over a large operating range of turbomachines, another advantage of this configuration also may lie in an enlarging of the operating range of turbomachines. An advantage may also lie in a simple structural conversion and/or applicability for already existing designs of turbomachines.

As blading in the sense of the present invention, an arrangement of rotating blades and/or an arrangement of guide vanes, in particular of one or more stages, is particularly intended. A blading according to the invention is particularly suitable for high-pressure compressors. In a preferred embodiment, an aircraft engine has a blading according to the invention.

A lateral wall in the sense of the present invention can be on the hub or rotor side, and/or the housing side and can be fixed on the hub or rotor, and/or the housing. Thus, a lateral wall may comprise the hub-side, i.e., radially inner and hub-fixed peripheral face of a rotating-blade grid, and/or the housing-side, i.e., radially outer peripheral face of a rotating-blade grid, which can be formed, in particular, by a shroud fixed to the hub or by an inner face fixed to the housing. Likewise, a lateral wall may comprise the housing-side, radially outer peripheral face and/or the hub-side peripheral face of a guide-vane grid, which can be formed, in particular, by a shroud fixed on the housing or by an outer face fixed on the hub.

In the sense of the present invention, a depression is to be understood particularly to be a region of the lateral wall that is offset radially inwardly relative to other regions of the lateral wall, while a thickened area or elevation in the sense of the present invention is to be understood particularly to be a region of the lateral wall that is offset radially outwardly relative to other regions of the lateral wall. A depression or thickened area in the sense of the present invention may be recessed or extended radially inwardly or outwardly, respectively, in particular, in relation to a particularly straight or curved reference conical surface that lies concentrically to an axis of rotation. The reference conical surface, in particular, can run through the radially innermost or radially outermost points of the lateral wall or therebetween. In particular, a radius of the reference conical surface may correspond to the average of the maximum and minimum or all radial extensions of the lateral wall. In addition, the depression or thickened area may also relate to a reference conical surface that runs through a non-contoured region of the lateral wall or a root or a tip of the blades.

In the sense of the present invention, a thickened area can be understood, in particular, as a radial dimension that is larger in comparison to the depression, while a depression is understood correspondingly as a radial dimension that is smaller in comparison to the thickened area.

For example, if one considers a sinusoidally channeled lateral wall in the peripheral direction, then the mountains or valleys represent thickened areas or depressions, respectively, relative to the central line, in the sense of the present invention. Likewise, one can proceed from a reference conical surface through the radially maximum or minimum amplitudes of the sinusoidally channeled lateral wall. Here also, the valleys represent depressions and the mountains represent thickened areas relative to this reference conical surface, since they lie in contrast radially further in (or further out).

A depression (thickened area) disposed at a suction or pressure side of the blade can be particularly characterized in that in a section in the peripheral direction, which is perpendicular to an axis of rotation of the turbomachine (see, e.g., L4 to L8 in EP 1 995 410 A1), in particular such a section in the axial center of the blading (see, e.g., L6 in EP 1 995 410 A1), the lateral wall at the blade root is sunk radially inwardly (elevated radially outwardly).

The lateral wall is preferably not contoured in the axial direction in front of and/or behind the pressure-side depressions and/or suction-side thickened areas, i.e., it has the same radius over the entire circumference of a radial section.

In a preferred embodiment, the depression or thickened area disposed at the pressure side of the blade and/or the thickened area or depression disposed at the suction side of the blade, viewed in the direction of flow, begins in front of, at, or in back of the leading edge of the blade.

The depression or thickened area disposed at the blade's pressure side and/or the thickened area or depression disposed in the region of the blade's suction side in the axial direction preferably extends over at least 10%, preferably at least 30%, in particular at least 50% and most preferred 60% of the axial grid length, and/or 100% at most, particularly 80% at most of the axial grid length, in each case measured between the leading and trailing edges of the blade.

In a preferred embodiment for the blading, the thickened area or depression disposed at the blade's suction side and/or the depression or thickened area disposed at the blade's pressure side is (are) disposed completely or partially in the axial half of the blade grid facing the inlet side.

In a preferred embodiment, a radial extreme point of the depressions and/or thickened area that is (are) disposed at a pressure or suction side of the blade in the axial direction is distanced at least 10%, in particular at least 20%, preferably at least 40% and/or 90% at most, in particular 80% at most, preferably 60% at most, of the blade chord length from the leading edge of the blade. In particular, a radial minimum of the depressions can lie in a region that extends between 20% and 60% of the blade chord length, measured from the leading edge of the blade. In particular, a radial maximum of the thickened area can lie particularly in a region that extends between 40% and 80% of the blade chord length, measured from the leading edge of the blade Another thickened area is preferably disposed in each case for the blading in the half facing the outlet side. This additional thickened area can be disposed and configured peripherally symmetrical. Alternatively, this additional thickened area can be disposed and configured peripherally asymmetrical. In a preferred embodiment, the ratio of the extent of this additional thickened area in the peripheral direction to its extent in the axial direction or the direction of flow can be smaller than 1, i.e., this additional thickened area can be "stretched" in the axial direction or the direction of flow.

The additional thickened area disposed in the half facing the outlet edge can extend preferably in the peripheral direction, at least essentially, from one blade to the adjacent blade. In the axial direction, the second thickened area can extend over at least 10% of the axial grid length in a preferred embodiment. This additional thickened area can be radially higher or lower than the thickened area disposed at a suction or pressure side of the blade.

Likewise, the depression disposed at a suction or pressure side of the blade can extend on both sides of this additional thickened area, i.e., this additional thickened area can be disposed in the depression disposed at a suction or pressure side of the blade. Such an additional thickened area then divides a fluid flow in the depression disposed at a suction or pressure side of the blade.

Additionally or alternatively, in a preferred embodiment, a peripherally symmetrical or peripherally asymmetrical additional thickened area can be disposed at the leading edge of a blade, in particular upstream of a depression disposed at a suction or pressure side of the blade in the direction of through flow. In this way, a fluid flow can be conducted away from the blade root into the depression disposed at a suction or pressure side of the blade.

The present invention can preferably be applied in blade grids that have a bent, particularly at least substantially orthogonal, transition from the blade's pressure side and/or suction side to the lateral wall; likewise also in the case of blade grids that have a rounded root surface in the transition region from the blade's pressure side and/or suction side to the lateral wall.

According to another aspect of the present invention relating to the manufacturing method, in the case of a manufacturing method for a blading for a turbomachine, at least one original shaping, reshaping and/or cutting treatment is executed in such a way that in the case of a lateral wall having a plurality of blades, thickened areas and depressions are formed, at least one depression or thickened area being formed at a blade's pressure side and at least one thickened area or depression being formed at a blade's suction side for each blade of the plurality of blades.

Advantageously, a blading having a high efficiency, particularly in a rapidly rotating high-pressure compressor (stage) can be provided by the configuration according to the invention.

BRIEF DESCRIPTION OF THE DRAWING FIGURES

Further advantages and features result from the dependent claims and the examples of embodiment. Shown for this purpose, partially schematized, are the following drawing figures:

DETAILED DESCRIPTION OF AN EXEMPLARY EMBODIMENT

In the figures that follow, matching reference numbers designate features that correspond to one another. Therefore, in the description of individual embodiments given below, reference is made essentially to the description of the other embodiments and only to the differences in the individual embodiments.

Figure 1:
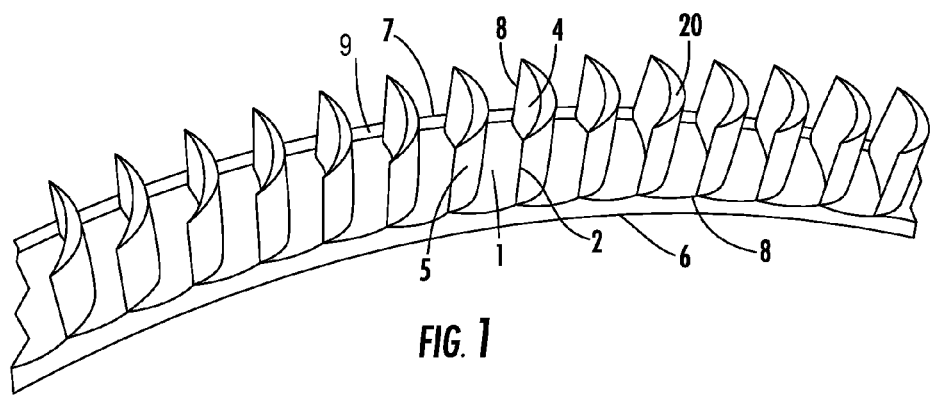
FIG. 1 is a perspective representation of a blading according to the invention.

FIG. 1 shows a perspective representation of a blading for a turbomachine with a contouring of a hub-side lateral wall 1 for a compressor stator grid in the hub region, the housing wall not being depicted in FIG. 1. A plurality of blades 20 with a blade leading edge 2, a blade trailing edge 3, a blade pressure side 4 and a blade suction side 5 are disposed on lateral wall 1, whereby lateral wall 1 can preferably have a non-contoured region 8 at the grid inlet and a non-contoured region 9 at the grid outlet. In addition, the inlet edge 6 on the blade root and the outlet edge 7 on the blade root can be recognized in FIG. 1.

Figure 2:
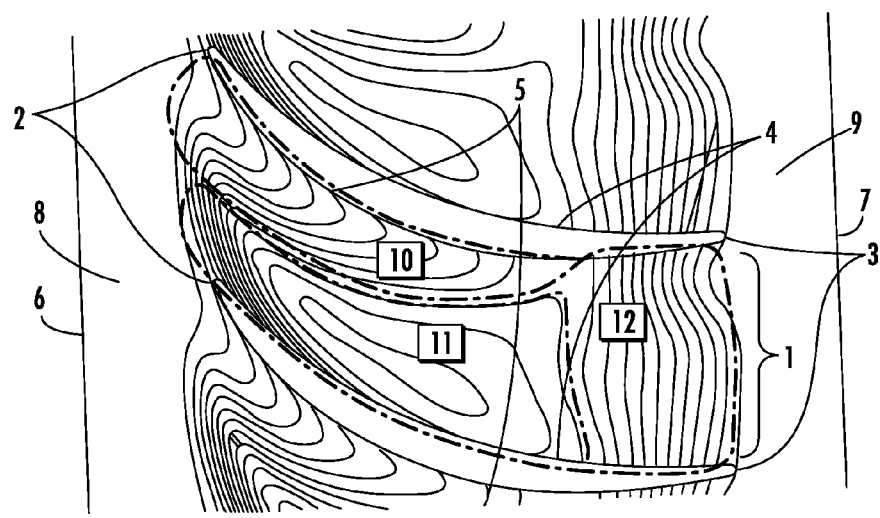
FIG. 2 is a contour diagram of the contouring of a lateral wall for an example of embodiment of the first aspect of the present invention in one execution.

FIG. 2 shows a representation of the contouring of lateral wall 1 for an example of embodiment of the blading according to the first aspect in a contour diagram, in which blades 20 do not have a rounded root surface and in which the isolines of the extent of the lateral-wall contour are shown in the direction orthogonal to the lateral wall. A depression 11 is disposed at blade pressure side 4 and a thickened area 10 is disposed at blade suction side 5. According to a preferred example of embodiment, this thickened area 10 can be formed by an elevation. According to another preferred example of embodiment, this thickened area 10 can be formed by a depression that is markedly smaller relative to depression 11. Preferably, another thickened area 12, which extends from the blade suction side 5 to the blade pressure side 4 is disposed in the half facing the outlet side (right in FIG. 2).

Figure 3:
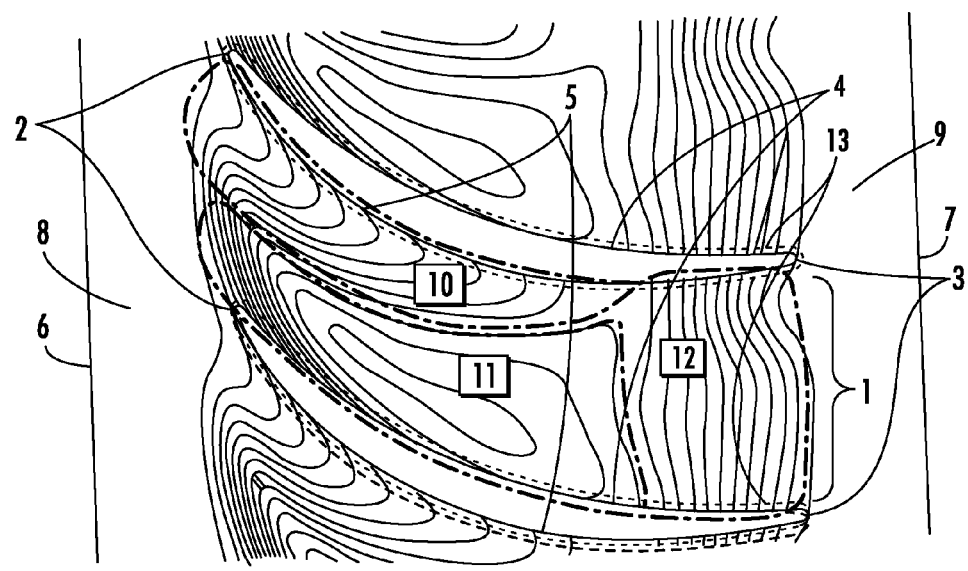
FIG. 3 is a contour diagram of the contouring of a lateral wall for another example of embodiment of the first aspect of the present invention in a representation corresponding to FIG. 2.

FIG. 3 shows a representation of the contouring of lateral wall 1 for another example of embodiment of the blading according to the first aspect in a contour diagram, in which blades 20 have a rounded root surface, which is shown by dashes in FIG. 3, and in which the isolines of the extent of the lateral-wall contour are shown in the direction orthogonal to the lateral wall. As in the example of embodiment shown in FIG. 2, the depression 11 is disposed at blade pressure side 4 and the thickened area 10 is disposed at blade suction side 5, and the second thickened area 12, which extends from the blade suction side 5 to the blade pressure side 4, is disposed in the half adjacent to the outlet side.

For illustration of the contouring in the case of different examples of embodiment, sectional views along the blade channel lengths are shown in the following, the sectional positions in the corresponding contour diagrams being shown in FIG. 4.

Figure 4:
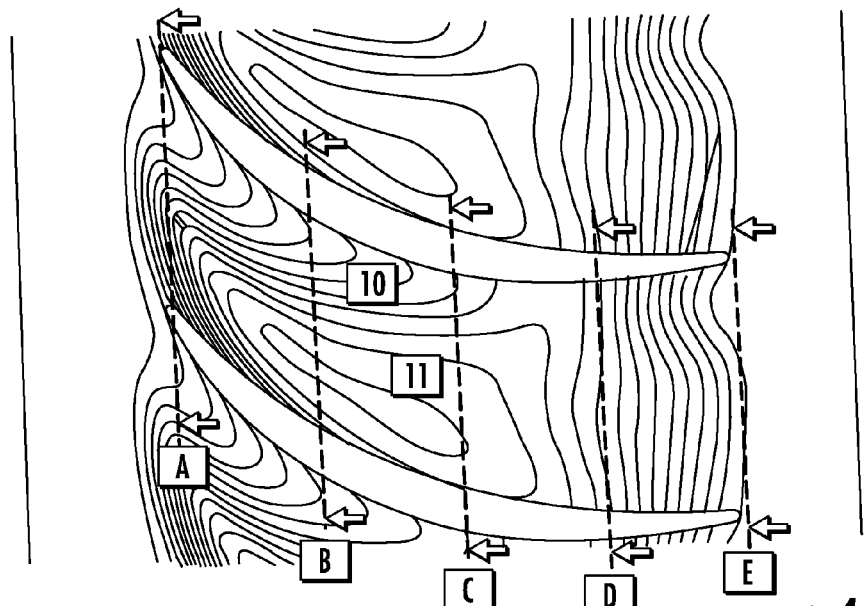
FIG. 4 is a representation corresponding to FIG. 2, in which positions of the sections of the subsequent figures are indicated.
Figure 5:
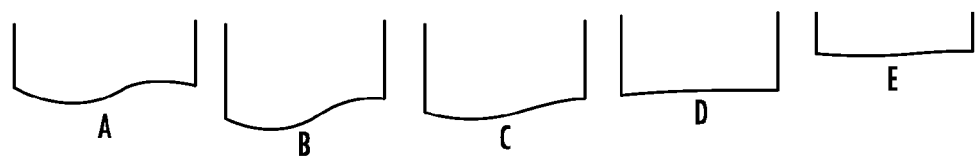
FIG. 5 is a series of sections along lines A, B, C, D and E in FIG. 4 for a first configuration of the blading.
Figure 6:
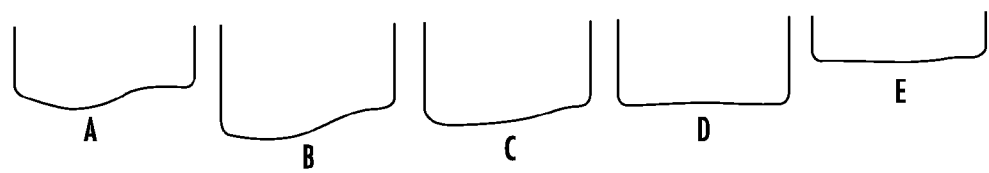
FIG. 6 is a series of sections along lines A, B, C, D and E in FIG. 4 for a second configuration of the blading.
Figure 7:
FIG. 7 is a series of sections along lines A, B, C, D and E in FIG. 4 for a third configuration of the blading.
Figure 8:
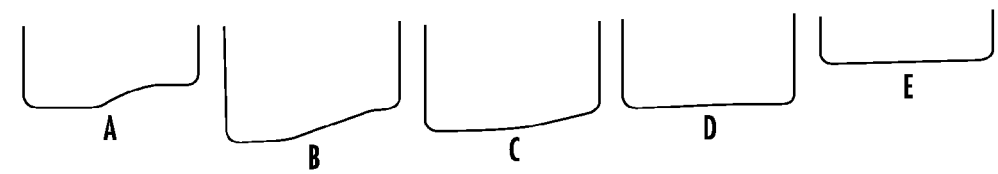
FIG. 8 is a series of sections along lines A, B, C, D and E in FIG. 4 for a fourth configuration of the blading.

FIG. 5 shows a representation of the blade walls and the hub-side lateral wall 1 from sections A, B, C, D and E in the sectional positions shown in FIG. 4 for a first configuration of the blading, which has a non-orthogonal transition of lateral wall 1 into blades 20 and no rounded root surface. The Sections A, B, C, D and E are described as follows:

A Section in the case of 1% blade channel length
B Section in the case of 25% blade channel length
C Section in the case of 50% blade channel length
D Section in the case of 75% blade channel length
E Section in the case of 99% blade channel length FIG. 6 shows a representation of the blade walls and the hub-side lateral wall 1 from sections A, B, C, D and E in the sectional positions shown in FIG. 4 for a second configuration of the blading, which has a non-orthogonal transition of lateral wall 1 into blades 20 and rounded root surface 13. FIG. 7 shows a representation of the blade walls and the hub-side lateral wall 1 from sections A, B, C, D and E in the sectional positions shown in FIG. 4 for a third configuration of the blading, which has an orthogonal transition of lateral wall 1 into blades 20 and no rounded root surface. FIG. 8 shows a representation of the blade walls and the hub-side lateral wall 1 from sections A, B, C, D and E in the sectional positions shown in FIG. 4 for a fourth configuration of the blading, which has an orthogonal transition of lateral wall 1 into blades 20 and rounded root surface 13. The invention can also be applied in combinations of an orthogonal and a non-orthogonal transition, in which an orthogonal transition results at blade pressure side 4 or at blade suction side 5, whereas a non-orthogonal transition from lateral wall 1 to blade 20 results at the other of the two blade walls delimiting the flow channel.

Figure 9:
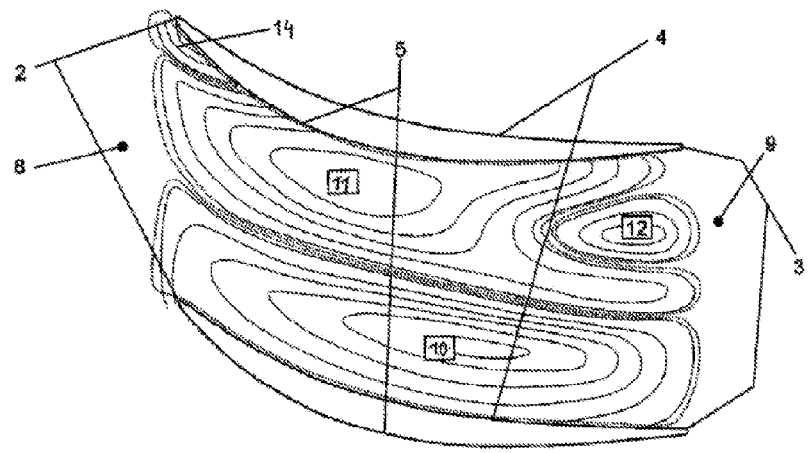
FIG. 9 is a contour diagram of the contouring of a lateral wall for an example of embodiment of the second aspect of the present invention in one execution.

FIG. 9 shows a representation of the contouring of lateral wall 1 for an example of embodiment of the blading according to the second aspect in a contour diagram, in which blades 20 do not have a rounded root surface, and in which the isolines of the extent of the lateral-wall contour are shown in the direction orthogonal to the lateral wall. A thickened area 10 is disposed at blade pressure side 4 and a depression 11 is disposed at blade suction side 5. According to a preferred example of embodiment, this thickened area 10 can be formed by an elevation. According to another preferred example of embodiment, this thickened area 10 can be formed by a depression that is markedly smaller relative to depression 11. Another thickened area 12 is preferably disposed in depression 11 and another thickened area 14 is disposed at the leading edge 2 of blades 20.

Figure 10:
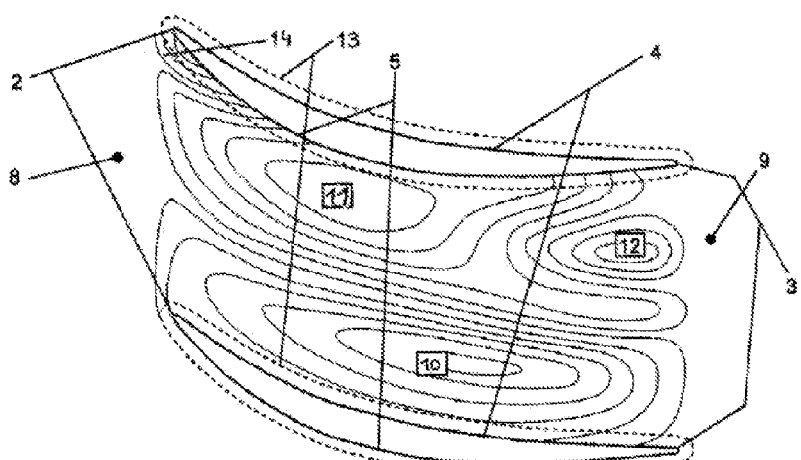
FIGS. 10 to 12 are contour diagrams of the contouring of a lateral wall for other examples of embodiment of the second aspect of the present invention in a representation corresponding to FIG. 9.

FIG. 10 shows a representation of the contouring of lateral wall 1 for another example of embodiment of the blading according to the second aspect in a contour diagram, in which blades 20 have a rounded root surface 13, which is shown by dashes in FIG. 10. In other respects, the example of embodiment of FIG. 10 corresponds to the above-described example of embodiment of FIG. 9.

Figure 11:
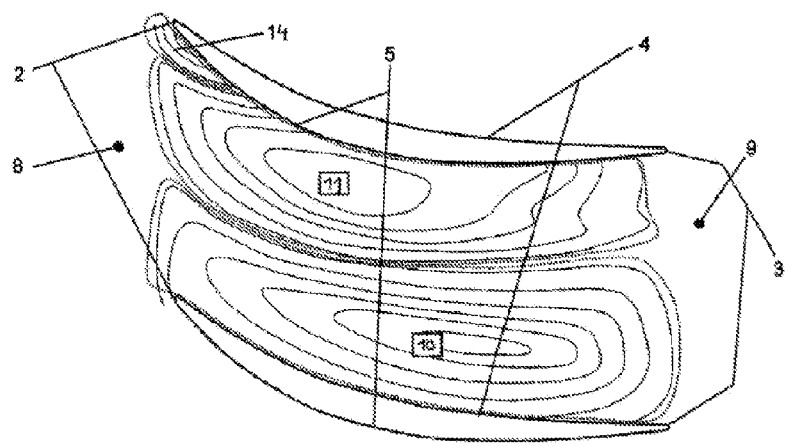

FIG. 11 shows a representation of the contouring of lateral wall 1 for another example of embodiment of the blading according to the second aspect in a representation corresponding to FIG. 9, in which no additional thickened area is provided in depression 11 (see additional thickened area 12 in FIG. 9). In other respects, the example of embodiment of FIG. 11 corresponds to the above-described example of embodiment of FIG. 9.

Figure 12:
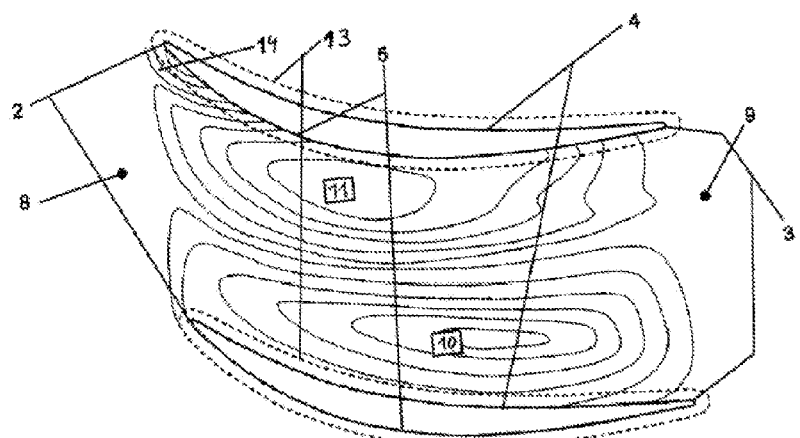

FIG. 12 shows a representation of the contouring of lateral wall 1 for another example of embodiment of the blading according to the second aspect in a representation corresponding to FIG. 10, in which no additional thickened area is provided in depression 11 (see additional thickened area 12 in FIG. 10). In other respects, the example of embodiment of FIG. 12 corresponds to the above-described example of embodiment of FIG. 10.

What is claimed is:

1. A blading for a turbomachine in which thickened areas and depressions are formed on a lateral wall having a plurality of blades, comprising:
   at least one depression disposed at a blade pressure side and at least one thickened area disposed at a blade suction side for each blade of the plurality of blades;
   at least one second thickened area, each of said second thickened areas being disposed at a leading edge of a respective one of the plurality of blades; and
   one of a peripherally symmetrical and peripherally asymmetrical third thickened area in a half of the blade grid facing the outlet side between the blade suction side and the blade pressure side.

2. The blading according to claim 1, wherein the lateral wall is not contoured axially in at least one of: a region in front of the thickened areas, a region behind the thickened areas, a region in front of the depressions, and a region behind the depressions.

3. The blading according claim 1, wherein at least one of: the depressions and the thickened areas that are arranged at a pressure or suction side of the blade, are disposed at least partially in the half of the blade grid facing the inlet side.

4. The blading according to claim 1, wherein at least one of: the depressions and thickened areas that are disposed at a pressure or suction side of the blade extend in the axial direction over at least 10% of the axial grid length.

5. The blading according to claim 1, wherein an extreme point of at least one of: the depressions and the thickened areas that are disposed at a pressure or suction side of the blade in the axial direction is distanced at least 10% of the blade chord length from the leading edge of the blade.

6. The blading according to claim 1, wherein this the third thickened area extends from the blade suction side to a blade pressure side of an adjacent blade or is disposed in the at least one depression.

7. The blading according to claim 1, wherein the second thickened area is one of a peripherally symmetrical and peripherally asymmetrical additional thickened inlet area at the inlet edge of a blade, in particular at least one of: the blade pressure and the suction side of the blade.

8. The blading according to claim 1, wherein the blade has a rounded root surface in the region of the transition from the blade to the lateral wall.

9. The blading according to claim 1, wherein the blade has an orthogonal transition in the region of the transition from the blade to the lateral wall.

10. The blading according to claim 1, wherein at least one of the depressions and thickened areas that are disposed at a pressure or suction side of the blade extend in the axial direction over at least 30% of the axial grid length.

11. The blading according to claim 1, wherein at least one of the depressions and thickened areas that are disposed at a pressure or suction side of the blade extend in the axial direction over at least 50% of the axial grid length.

12. The blading according to claim 1, wherein at least one of the depressions and thickened areas that are disposed at a pressure or suction side of the blade extend in the axial direction over at least 60% of the axial grid length.

13. The blading according to claim 1, wherein an extreme point of at least one of: the depressions and the thickened areas that are disposed at a pressure or suction side of the blade in the axial direction is distanced at least 20% of the blade chord length from the leading edge of the blade.

14. The blading according to claim 1, wherein an extreme point of at least one of: the depressions and the thickened areas that are disposed at a pressure or suction side of the blade in the axial direction is distanced at least 40% of the blade chord length from the leading edge of the blade.

15. The blading according to claim 1, wherein an extreme point of at least one of: the depressions and the thickened areas that are disposed at a pressure or suction side of the blade in the axial direction is distanced at most 90% of the blade chord length from the leading edge of the blade.

16. The blading according to claim 1, wherein an extreme point of at least one of: the depressions and the thickened areas that are disposed at a pressure or suction side of the blade in the axial direction is distanced at least at most 80% of the blade chord length from the leading edge of the blade.

17. A method for manufacturing a blading having at least one of: at least one reshaping and at least one cutting treatment, such that thickened areas and depressions are formed in the case of a lateral wall having a plurality of blades comprising the steps of forming at least one depression or thickened area at a blade pressure side and forming at least one thickened area or depression at a blade suction side for each blade of the plurality of blades; and forming at least one second thickened area, each of said second thickened areas being disposed at a leading edge of a respective one of the plurality of blade; and forming one of a peripherally symmetrical and peripherally asymmetrical third thickened area in a half of the blade grid facing the outlet side between the blade suction side and the blade pressure side.

* * * * *